A. K. WEBSTER.
TWO ROW CUTTER AND CONVEYER FOR CORN BINDERS.
APPLICATION FILED JUNE 24, 1912.
1,144,515.
Patented June 29, 1915.
2 SHEETS—SHEET 1.
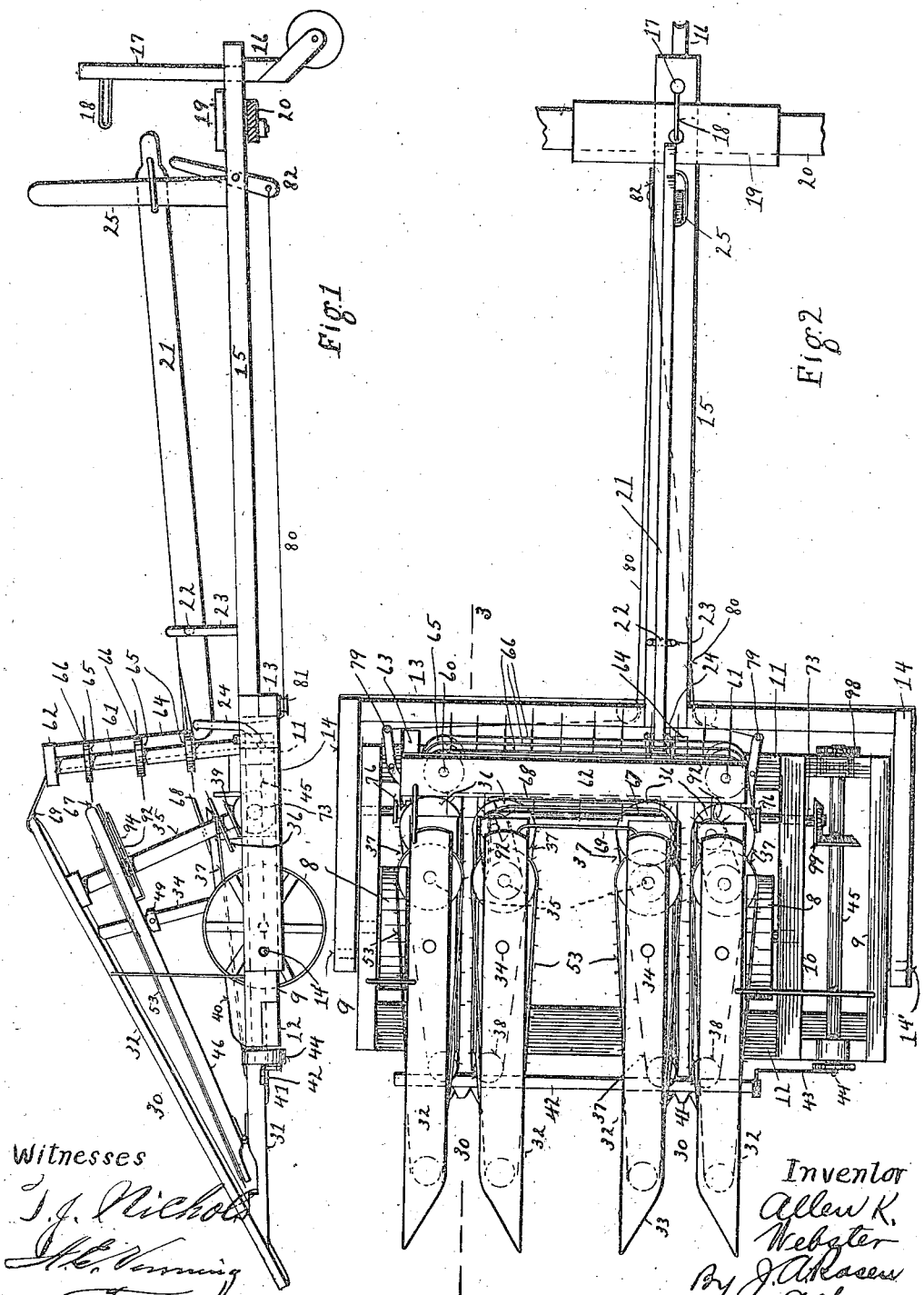

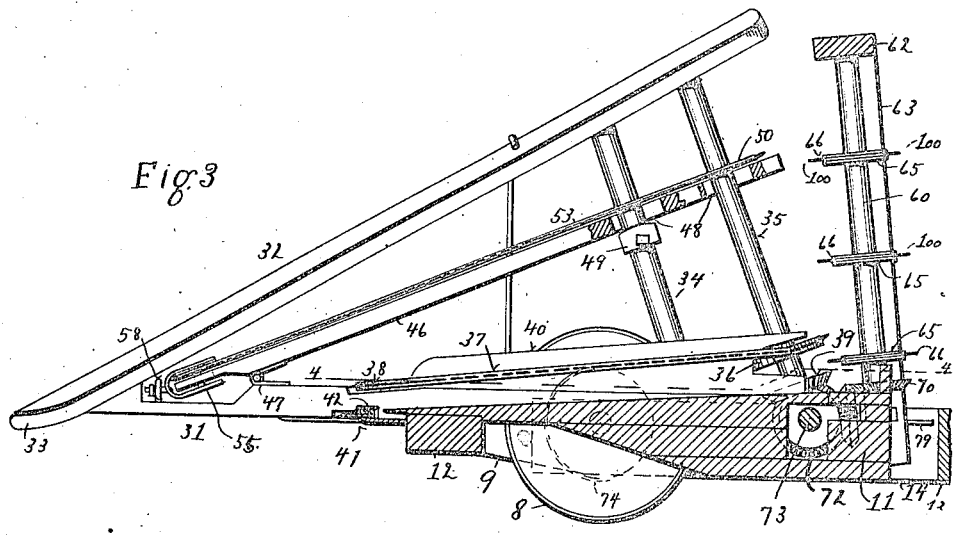

UNITED STATES PATENT OFFICE.

ALLEN K. WEBSTER, OF BROOKVILLE, KANSAS.

TWO-ROW CUTTER AND CONVEYER FOR CORN-BINDERS.

1,144,515.  Specification of Letters Patent.  Patented June 29, 1915.

Application filed June 24, 1912.  Serial No. 705,525.

*To all whom it may concern:*

Be it known that I, ALLEN K. WEBSTER, a citizen of the United States, residing at Brookville, in the county of Saline and State of Kansas, have invented certain new and useful Improvements in Two-Row Cutters and Conveyers for Corn-Binders, of which the following is a specification.

It is the object of my invention to cut at the same time two rows of corn, convey the stalks and deliver them in vertical position to the binder.

My invention comprises a suitable frame with traction wheels, two ways mounted on the frame with a cutter in each way, also with suitable conveyer chains mounted along each side of each way and extending lengthwise of the machine, and a transverse way at the rear end of the lengthwise ways for conveying the stalks from the longitudinal ways and delivering them in upright position to the binder; and although the binder is not, strictly speaking a part of this invention, I contemplate mounting the binder on the frame at one side so as to take the stalks as they come from the transverse conveyer and bind them in the usual manner, the binder being driven from the traction wheels; and it also consists of the parts, improvements, and combinations hereinafter set forth and claimed.

In the drawings accompanying and forming part of this specification and in the description of the drawings, I have shown my invention in its preferred form and what I deem to be the best mode of applying the principles thereof; but it is to be understood that within the scope of the appended claims I contemplate changes in form, proportions, and materials, the transposition of parts, and the substitution of equivalent members, without departing from the spirit of my invention.

Figure 1 is a side elevation of a two-row cutter and conveyer for corn-binders, made in accordance with the principles of my invention. Fig. 2 is a plan view. Fig. 3 is an enlarged sectional elevation on the plane indicated approximately by the line 3 in Fig. 2. Fig. 4 is a sectional plan view approximately on the plane indicated by the line 4 in Fig. 4, certain parts being broken away or removed. Fig. 5 is a detail of the conveyer chain tightening device. Fig. 6 is a plan view of one of the corner conveyers and adjacent parts.

Similar reference characters indicate like or corresponding parts throughout the several views.

8, 8 are the traction wheels of any suitable kind which supports the main frame comprising principally the longitudinal beams 9, 9, 10, and the transverse beams 11, 12.

13 is a transverse beam arranged back of the main frame and having the forward side extensions 14, 14, to which the main frame is pivoted at 14', 14'.

15 is the tongue extending back from the beam 13 and provided at its rear end with a caster wheel 16, whose stem 17 is provided with a handle 18, by which it may be guided, as by the driver standing astride said handle on the platform 19.

20 is the double-tree, to which the draft animals are attached.

21 is a lever pivoted at 22 in the standard 23, and pivoted also to a link 24 at its forward end, which link is secured to said main frame.

25 is a post on the tongue at the rear end of the lever, and its purpose is to attach the lever thereto in any position to which it may be adjusted. The purpose of the lever is to tilt the main frame at any desired angle, within a suitably wide range; thus by bearing down on the rear end of the lever, the forward end of the main frame will be tilted downward; by shifting the lever handle up, the front end of the main frame will be lifted.

30, 30 are two corn-cutters and conveyers of any suitable kind, but preferably of the kind herein shown. They are parallel to each other, are supported on the main frame, and extend from front to rear. The top guide 32 on each side of each element is inclined upwardly from front to back, the points being flared outwardly, as shown at 33. Each is supported at its forward end by the stringer 31 and back therefrom by the rod 34.

35 is a shaft having a substantially vertical position, though leaning slightly toward the front, and mounted in the rear of each side of each conveyer element. 36 is a sprocket wheel mounted on the lower part of said shaft. 37 is a sprocket chain, or conveyer chain, passing over said sprocket and also over the sprocket 38 in the forward part of the conveyer. 39 is a bevel gear by which said shaft 35 is driven.

40 is a board or guide just inside the sprocket chain and facing the channel of the conveyer to hold the chain in line.

41 is the cutter at the forward end of the conveyer; 42 is the sickle bar connected by pitman 43 with the crank disk 44 on shaft 45.

46 is a support hinged at its forward end to the stringer, 31, as shown at 47. The support is slotted at 48 to engage the rod 34 and shaft 35. 49 is a supporting block for said support, secured to the rod 34 by any suitable means, as by a set screw by which the block and support may be raised and lowered and held in any desired position. 50 is a sprocket wheel mounted on the shaft 35 and resting against said support, and having a pin 51 which engages in a groove 52 in said shaft; so that although said wheel rotates with the shaft it is free to be moved vertically thereon with its support. 53 is a sprocket chain passing over said sprocket wheel and also over the sprocket wheel 54 at the forward end. The latter wheel is mounted in a clevis 55 whose pin also passes through a slot 56 in said support 46, and whose stem 57 is adjustably secured to a bracket or eyelet 58 secured to the stringer 31; whereby the conveyer chain may be tightened or loosened to compensate for its vertical adjustment with the support.

From the foregoing description, it will be understood that the corn stalks are cut by the cutters in the respective conveyers and are conveyed by said conveyers from front to rear. The two conveyers are so disposed as to ride along two adjacent rows of corn, being spaced apart according to the generally accepted distance, but, by reason of the flared points being adapted to rows of slightly greater or less distance apart, as well as to irregularities in each row. It will also be understood that each conveyer, as in the case of others now in use, conveys the stalks in upright position. It is also to be specially noted that the tongue is so disposed as to place the draft animals between the rows that have already been cut.

60 and 61 are two vertically disposed shafts mounted between the lower part of the main frame and the beam 62, which latter is supported by means of the two studs 63 and 64.

65, 65 are a series of sprocket wheels, preferably three on each shaft and carrying the three conveyer chains 66, 66, 66, these parts being so disposed as to operate the conveyer chains transversely of the main frame immediately behind the two longitudinal conveyers.

67, 68, and 69 are three bars or rods spanning the space between the two conveyers to form a front for the transverse conveyer channel, against which the stalks bear when moved along by the drag-pins 100 on said transverse conveyer chains. Secured to the shaft 60 is a bevel gear 70 which meshes with the two-faced bevel gear 71 which meshes with the adjacent bevel gear 72 on the shaft 73 which is mounted in the main frame. There are four of the gears 72, two for each longitudinal conveyer, meshing respectively with the bevel gears 39, 39 on the shafts 35, 35.

74, 74 are two sprocket wheels secured to the traction wheels. 75, 75 are sprocket chains passing over said sprocket wheels and over the sprocket wheels 76 mounted on the shaft 73. These latter sprocket wheels are ratchet-faced, as shown at 77, in order to have one-way engagement with the adjacent one of the bevel gears 72 and thus to turn the shaft 73. The ratchet-faces are engaged under the pressure of the spring 78, and may be disengaged by the levers 79, 79, which are connected by means of ropes 80, 80, connected with operating lever 82, passing over pulleys 81, 81. It will be understood that by operating this lever, the conveyer and cutting mechanism may be disconnected from the traction wheels; also it will be understood that the two ratchet faces compensate for the unequal travel of the two traction wheels in turning a corner. The shaft 73 is also operatively connected with the shaft 45 by the miter gears 99; and the shaft 45 also has a sprocket or other wheel 98 adapted to transmit the power from the traction wheels to the corn-binder which may be mounted on the left-hand side of the machine, as on the beams 10 and 9 at the left-hand side of the machine, and so as to receive the corn-stalks from the transverse conveyer.

The conveyer chains are all provided with drag-pins 100, those in the transverse conveyer being longer than those in the longitudinal conveyers.

In order to throw, or assist in throwing, the stalks around the corners from the longitudinal conveyers into the transverse conveyer, I provide a sprocket wheel 92 at each corner toward the binder, said wheel being mounted on a shaft 93 and carrying a sprocket chain 90 with rather long drag-pins, said chain also passing over the drive sprocket 91, which is mounted on said shaft 35 in the same manner as the sprocket 50 is mounted on said shaft, but under the support and above the bracket 94. In Figs. 1 and 2, I have shown the sprocket 91 as smaller than sprocket 50; but I prefer that it be larger, as shown in Fig. 6, in order that its chain will travel faster and thus tend to get the stalks more quickly around the corner and thus prevent any tendency to bunch where the stalks pass from the longitudinal conveyer to the transverse conveyers.

What I claim as new and desire to secure by Letters Patent is:

1. In a machine of the character described, the combination of a frame, a guide inclined upwardly from front to rear and mounted on the frame, a substantially vertical drive shaft at the rear end of said guide and frame, a sprocket wheel mounted on said shaft so as to be movable longitudinally thereon but non-rotatable independently of said shaft, a support for said sprocket wheel that is hinged to the forward part of the frame, a sprocket wheel mounted on the forward end of said support, a conveyer chain mounted on said sprocket wheels, and means for adjusting said support lengthwise of said shaft.

2. In a machine of the kind described, the combination of a frame, a guide inclined upwardly from front to rear and mounted on the frame an inclined drive shaft at the rear end of said guide and frame, a sprocket wheel mounted on said shaft so as to be movable longitudinally thereon but non-rotatable independently of said shaft, a support for said sprocket wheel that is hinged to the forward part of the frame, a sprocket wheel mounted on the forward end of said support, a conveyer chain mounted on said sprocket wheels, means for adjusting the second-named sprocket wheel, and means for adjusting said support lengthwise of said shaft.

In testimony whereof I have affixed my signature in presence of two witnesses.

ALLEN K. WEBSTER.

Witnesses:
T. J. Nichols,
A. E. Verming.